US011827094B2

(12) United States Patent
Nagashima

(10) Patent No.: US 11,827,094 B2
(45) Date of Patent: Nov. 28, 2023

(54) ACCELERATOR PEDAL DEVICE

(71) Applicant: MIKUNI CORPORATION, Tokyo (JP)

(72) Inventor: Jun Nagashima, Kanagawa (JP)

(73) Assignee: MIKUNI CORPORATION, Tokyo (JP)

( * ) Notice: Subject to any disclaimer, the term of this patent is extended or adjusted under 35 U.S.C. 154(b) by 0 days.

(21) Appl. No.: 17/296,979

(22) PCT Filed: Feb. 1, 2019

(86) PCT No.: PCT/JP2019/003575
§ 371 (c)(1),
(2) Date: May 26, 2021

(87) PCT Pub. No.: WO2020/157949
PCT Pub. Date: Aug. 6, 2020

(65) Prior Publication Data
US 2022/0009349 A1    Jan. 13, 2022

(51) Int. Cl.
*B60K 26/02*    (2006.01)
*G05G 1/38*    (2008.04)
(Continued)

(52) U.S. Cl.
CPC ............. *B60K 26/021* (2013.01); *G05G 1/38* (2013.01); *G05G 1/44* (2013.01); *G05G 5/03* (2013.01); *G05G 2505/00* (2013.01)

(58) Field of Classification Search
None
See application file for complete search history.

(56) References Cited

U.S. PATENT DOCUMENTS 8,457,855 B2 * 6/2013 Sakaguchi ........... B60K 26/021
701/79
2005/0209743 A1 * 9/2005 Egami ..................... G05G 1/30
701/1
(Continued)

FOREIGN PATENT DOCUMENTS

JP     2007076469    3/2007
JP      4553057     9/2010
(Continued)

OTHER PUBLICATIONS

"International Search Report (Form PCT/ISA/210) of PCT/JP2019/003575", with English translation thereof, dated Apr. 16, 2019, pp. 1-4.

*Primary Examiner* — Vicky A Johnson
(74) *Attorney, Agent, or Firm* — JCIPRNET

(57) ABSTRACT

An accelerator pedal device of the present invention includes: an accelerator pedal; a hysteresis generation mechanism that generates a hysteresis in pedal effort during a depression operation and a return operation of the accelerator pedal; a reaction force addition mechanism that adds a reaction force in a direction to push back the accelerator pedal; and a control unit that controls the drive of the reaction force addition mechanism in a manner that, with a predetermined target opening degree at which the accelerator pedal is depressed as a boundary, a ratio of change in the pedal effort in an opening degree range above the target opening degree becomes relatively larger than a ratio of change in pedal effort in an opening degree range below the target opening degree.

11 Claims, 11 Drawing Sheets

(51) Int. Cl.
   *G05G 1/44*      (2008.04)
   *G05G 5/03*      (2008.04)

(56) References Cited

U.S. PATENT DOCUMENTS

| | | | |
|---|---|---|---|
| 2011/0125367 A1* | 5/2011 | Sakaguchi | B60K 26/021 |
| | | | 701/36 |
| 2013/0118295 A1* | 5/2013 | Sakaguchi | F02D 11/04 |
| | | | 74/513 |
| 2014/0316648 A1 | 10/2014 | Min | |
| 2015/0298546 A1* | 10/2015 | Maruyama | B60W 10/00 |
| | | | 903/902 |

FOREIGN PATENT DOCUMENTS

| | | |
|---|---|---|
| JP | 2012171526 | 9/2012 |
| JP | 2016049814 | 4/2016 |
| JP | 2018090186 | 6/2018 |

\* cited by examiner

ACCELERATOR PEDAL DEVICE

CROSS-REFERENCE TO RELATED APPLICATION

This application is a 371 application of the International PCT application serial no. PCT/JP2019/003575, filed on Feb. 1, 2019. The entirety of the above-mentioned patent application is hereby incorporated by reference herein and made a part of this specification.

BACKGROUND

Technical Field

The present invention relates to an accelerator pedal device which is applied to a vehicle such as an automobile or the like, and particularly relates to an accelerator pedal device including a reaction force addition mechanism which adds a reaction force to pedal effort of an accelerator pedal.

Related Art

As an accelerator pedal device applied to an automobile or the like, an accelerator pedal effort control device is known which includes an accelerator opening degree detection part that detects an accelerator opening degree, a pedal effort change part that changes pedal effort of an accelerator pedal, and a threshold value set part that sets a predetermined threshold value according to a driving condition of an engine or a vehicle (for example, see Patent literature 1).

In the device, if the accelerator opening degree reaches the threshold value, the pedal effort of the accelerator pedal is set to be stepwise increased by a predetermined amount.

In addition, when the accelerator opening degree is reduced, the pedal effort which is stepwise increased is set to be released at an accelerator opening degree smaller than the threshold value to prevent flapping of the accelerator pedal along with a rapid increase in the pedal effort.

However, in the device, because the reaction force is stepwise added with the threshold value as a boundary, there is a possibility that a driver will unconsciously respond to a rapid change and excessively return the accelerator pedal, and when this threshold value is set as, for example, a threshold value of a driving mode of eco-driving, if the reaction force is too strong, the accelerator opening degree is difficult to maintain in this driving mode.

In addition, due to the rapid increase in the reaction force, there is a possibility that the driver will feel heaviness of the pedal, which may lead to tiredness of the food if the state continues.

LITERATURE OF RELATED Art

Patent Literature

Patent literature 1: Japanese Patent No. 4553057

SUMMARY

Problems to be Solved

The present invention has been made in view of the above circumstances, and has an object to provide an accelerator pedal device which is capable of easily recognizing a target opening degree that is previously set according to a driving state and easily maintaining this target opening degree, and has excellent operationality for not making the driver feel uncomfortable or tired.

Means to Solve Problems

An accelerator pedal device of the present invention includes: an accelerator pedal; a hysteresis generation mechanism that generates a hysteresis in pedal effort during a depression operation and a return operation of the accelerator pedal; a reaction force addition mechanism that adds a reaction force in a direction to push back the accelerator pedal; and a control unit that controls the drive of the reaction force addition mechanism in a manner that, with a predetermined target opening degree at which the accelerator pedal is depressed as a boundary, a ratio of change in the pedal effort in an opening degree range above the target opening degree becomes relatively larger than the ratio of change in the pedal effort in an opening degree range below the target opening degree.

In the accelerator pedal device, a configuration may be used in which the control unit controls the drive of the reaction force addition mechanism in a manner as not being to add the reaction force at the target opening degree.

In the accelerator pedal device, a configuration may be used in which the control unit controls the drive of the reaction force addition mechanism in order to add, in the opening degree range below the target opening degree, the reaction force which is gradually reduced along with the increase in the opening degree of the accelerator pedal.

In the accelerator pedal device, a configuration may be used in which the control unit controls the drive of the reaction force addition mechanism in order to add, in the opening degree range above the target opening degree, the reaction force which is gradually increased along with the increase in the opening degree of the accelerator pedal.

In the accelerator pedal device, a configuration may be used in which the control unit controls the drive of the reaction force addition mechanism in order to add, in the opening degree range below the target opening degree, a reaction force which is gradually reduced along with the increase in the opening degree of the accelerator pedal; and add, in the opening degree range above the target opening degree, a reaction force which is gradually increased along with the increase in the opening degree of the accelerator pedal.

In the accelerator pedal device, a configuration may be used in which the target opening degree includes a plurality of target opening degrees which are previously set corresponding to various driving states of a vehicle, and the control unit controls the drive of the reaction force addition mechanism based on a target opening degree corresponding to a command based on the driving state of the vehicle.

In the accelerator pedal device, a configuration may be used in which the control unit controls the drive of the reaction force addition mechanism in order to add the reaction force in a manner that the ratio of change in the pedal effort has magnitude according to an operation force of the accelerator pedal.

In the accelerator pedal device, a configuration may be used in which the control unit controls the drive of the reaction force addition mechanism in conjunction with an operation of a switch arranged on the vehicle.

In the accelerator pedal device, a configuration may be used in which the reaction force addition mechanism includes a torque motor which exerts a rotational torque taken as the reaction force, and the control unit adjusts a magnitude of a drive current supplied to the torque motor according to the opening degree of the accelerator pedal.

In the accelerator pedal device, a configuration may be used in which a detection sensor which detects the motion of the accelerator pedal is included, and the control unit controls the drive of the torque motor based on information of the detection sensor.

In the accelerator pedal device, a configuration may be used in which the control unit controls the drive of the torque motor based on information related to the driving state of the vehicle.

Effect

According to the accelerator pedal device which forms the above-described configurations, an accelerator pedal device can be achieved which is capable of easily recognizing a target opening degree that is previously set according to a driving state and easily maintaining this target opening degree, and has excellent operationality for not making the driver feel uncomfortable or tired.

DESCRIPTION OF THE EMBODIMENTS

Figure 1:
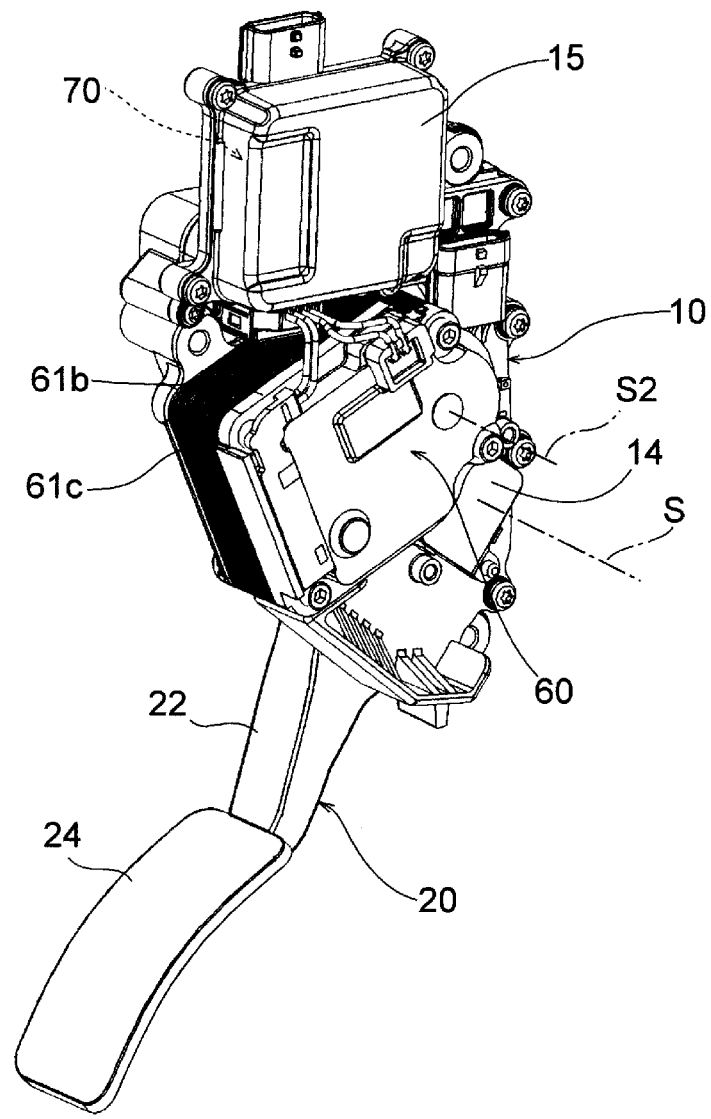
FIG. 1 is an external perspective view showing an embodiment of an accelerator pedal device according to the present invention.

Hereinafter, embodiments of the present invention are described with reference to the accompanying drawings. As shown in FIGS. 1 to 4, an accelerator pedal device according to an embodiment includes a housing 10 which is fixed to a body of an automobile or the like used as a vehicle, an accelerator pedal 20, a return spring 30, a hysteresis generation mechanism 40, a position sensor 50, a reaction force addition mechanism 60, and a control unit 70.

The housing 10 is formed by a resin material, and includes a support shaft 11, an accommodation portion 12, an accommodation portion 13, an embedding portion 14, and an accommodation portion 15.

The support shaft 11 is formed in a columnar shape centering on an axis line S, and supports the accelerator pedal 20 to oscillate freely around the axis line S in a depression operation and a return operation of the accelerator pedal 20.

In the inside of the housing 10, the accommodation portion 12 accommodates the return spring 30 and a part of the reaction force addition mechanism 60.

In the inside of the housing 10, the accommodation portion 13 accommodates the hysteresis generation mechanism 40.

The embedding portion 14 embeds a part of the position sensor 50 in the surrounding of the axis line S.

In a region above the housing 10, the accommodation portion 15 accommodates the control unit 70 which performs electrical connection with the outside.

Figure 2:
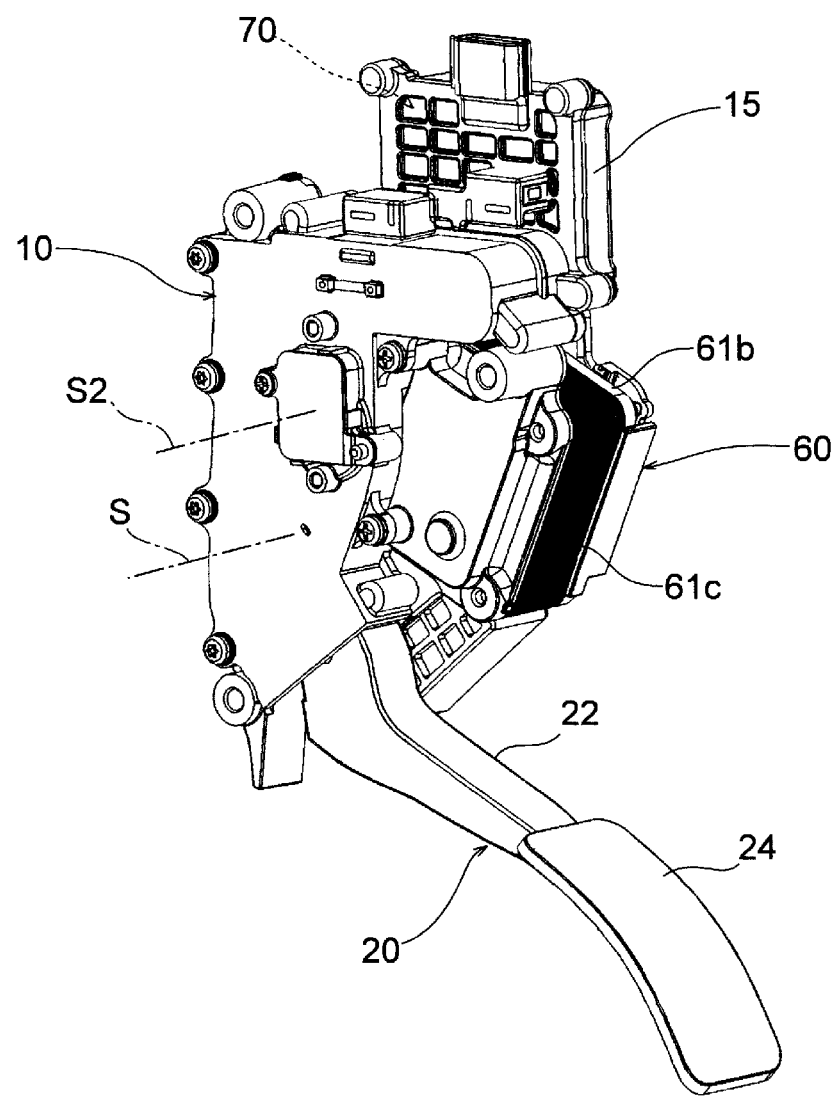
FIG. 2 is an external perspective view obtained by observing the accelerator pedal device shown in FIG. 1 from another direction.
Figure 3:
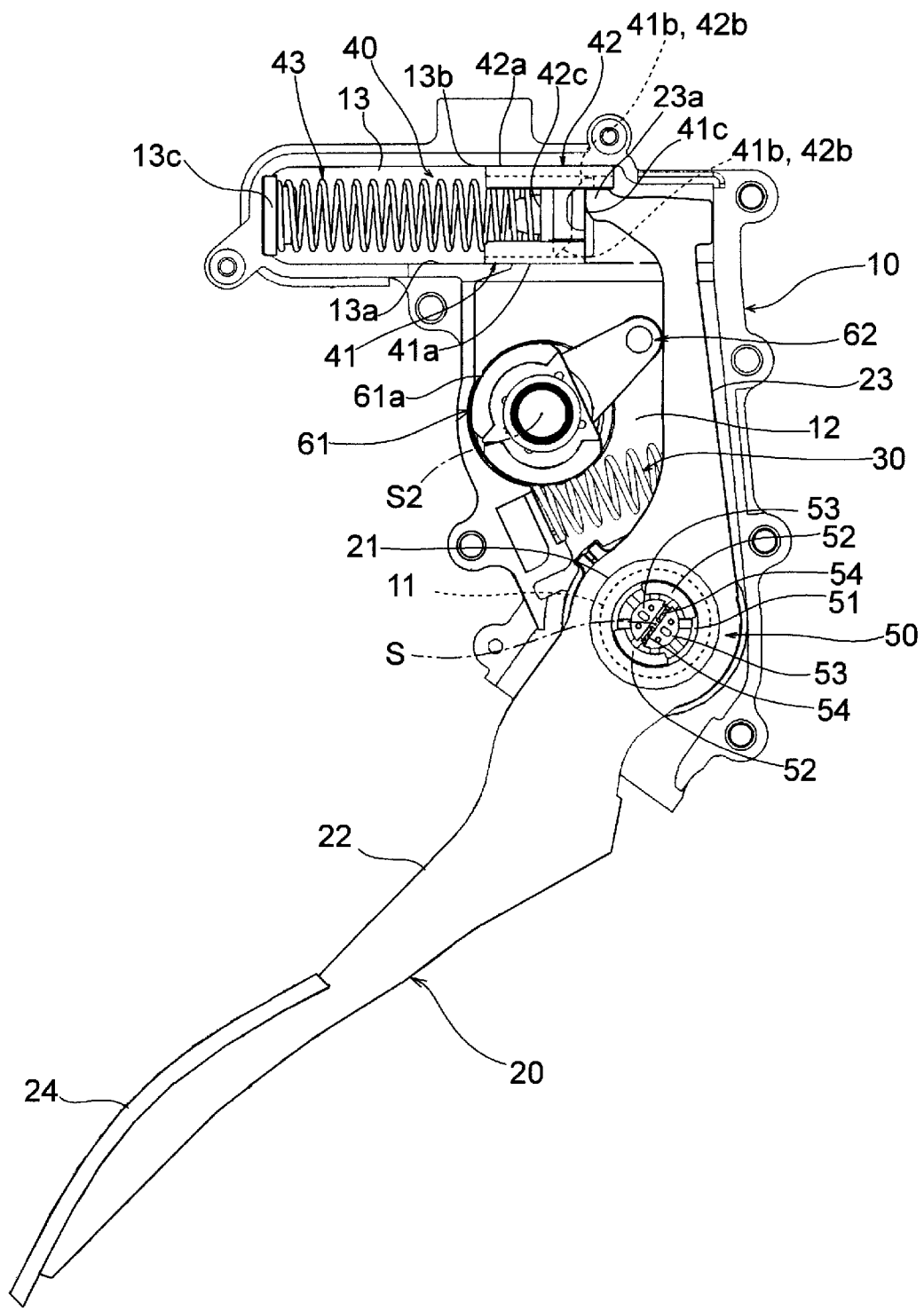
FIG. 3 is a side view showing an internal structure of the accelerator pedal device shown in FIG. 1.

The entire accelerator pedal 20 is formed by a resin material, and as shown in FIGS. 1 to 3, the accelerator pedal 20 includes a cylindrical portion 21, a lower-side arm portion 22, an upper-side arm portion 23, and a pedal portion 24.

The cylindrical portion 21 is fitted to the support shaft 11 of the housing 10 and is supported to pivot freely.

The lower-side arm portion 22 stretches downwards from the cylindrical portion 21 and is integrally formed.

The upper-side arm portion 23 stretches upwards from the cylindrical portion 21 and is integrally formed. The upper-side arm portion 23 is engaged with a first slider 41 of the hysteresis generation mechanism 40, a return lever 62 of the reaction force addition mechanism 60, and the return spring 30.

The pedal portion 24 is integrally formed in a region below the lower-side arm portion 22.

As shown in FIG. 3, the return spring 30 is a compression type coil spring formed by spring steel or the like. The return spring 30 is disposed in a compressed state in which one end portion is engaged with an inner wall of the housing 10, and the other end portion is engaged with the upper-side arm portion 23 of the accelerator pedal 20 in a position close to the cylindrical portion 21.

Besides, the return spring 30 exerts an urging force for returning the accelerator pedal 20 to a rest position.

As shown in FIG. 3, the hysteresis generation mechanism 40 includes the first slider 41, a second slider 42, and an urging spring 43.

The first slider 41 is formed by a resin material, for example, a high sliding property material such as oil-impregnated polyacetal or the like. The first slider 41 has: a contact surface 41a which is in contact with a lower-side inner wall surface 13a of the housing 10 in a way of sliding freely; an inclined surface 41b which is in contact with an inclined surface 42b of the second slider 42; and an engagement surface 41c with which an upper end portion 23a of the upper-side arm portion 23 can be separably engaged.

The second slider 42 is formed by a resin material, for example, a high sliding property material such as oil-impregnated polyacetal or the like. The second slider 42 has: a contact surface 42*a* which is in contact with an upper-side inner wall surface 13*b* of the housing 10 in a way of sliding freely; the inclined surface 42*b* which is in contact with the inclined surface 41*b* of the first slider 41; and a receiving surface 42*c* which receives one end portion of the urging spring 43.

The urging spring 43 is, for example, a compression type coil spring formed by spring steel or the like. The urging spring 43 is disposed in a compressed state in which one end portion is engaged with the receiving surface 42*c* of the second slider 42, and the other end portion is engaged with an inner wall 13*c* of the housing 10.

Besides, the urging spring 43 exerts a wedge action of pressing the inclined surface 42*b* of the second slider 42 against the inclined surface 41*b* of the first slider 41, and pressing the first slider 41 and the second slider 42 toward the lower-side inner wall surface 13*a* and the upper-side inner wall surface 13*b*. The urging spring 43 exerts an urging force for returning the accelerator pedal 20 to the rest position via the first slider 41 and the second slider 42.

Thus, when the accelerator pedal 20 is depressed from the rest position toward a maximum depression position against the urging forces of the return spring 30 and the urging spring 43, the upper-side arm portion 23 pushes the first slider 41 toward the left in FIG. 3 against the urging force of the urging spring 43.

During the depression operation, by the urging force exerted by the urging spring 43, the first slider 41 and the second slider 42 exert a wedge action on each other, and a frictional force (sliding resistance) is generated with respect to the housing 10. The frictional force during the depression operation acts in a direction to resist against the depression operation, and is increased along with increase in a compression amount of the urging spring 43.

Figure 5:
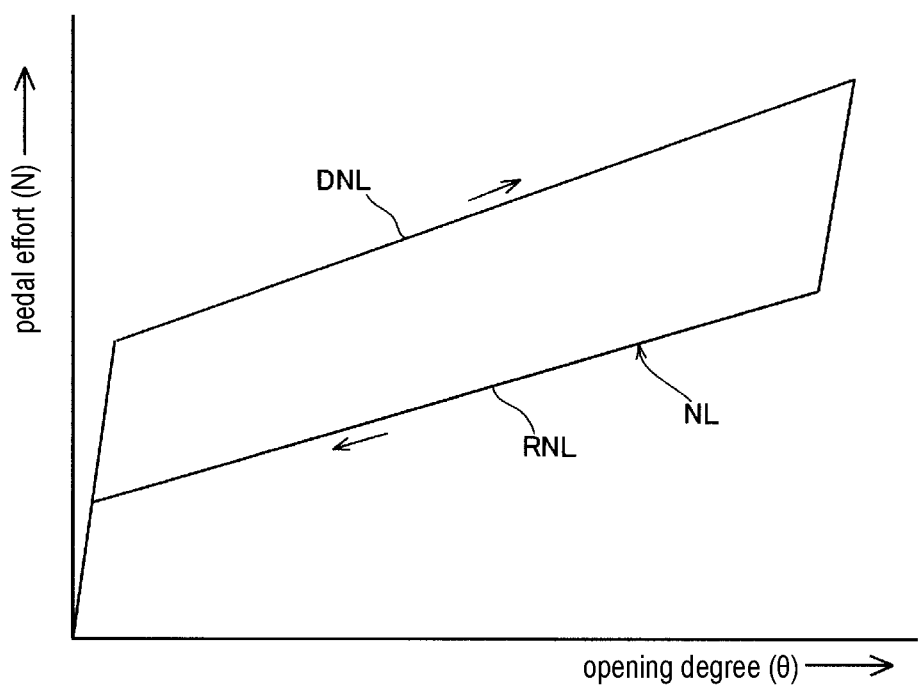
FIG. 5 is a pedal effort characteristic diagram showing pedal effort which forms a hysteresis generated by a hysteresis generation mechanism included in the accelerator pedal device shown in FIG. 1.

Thus, due to a resultant force of the frictional force during the depression operation and the urging force of the urging spring 43 which is increased according to depression operation, pedal effort during the depression is shown as a pedal effort line DNL on the upper side of a pedal effort line NL which forms a hysteresis of FIG. 5, and is increased linearly along with the increase in the depression amount (the opening degree of the accelerator pedal).

Meanwhile, when the accelerator pedal 20 is returned toward the rest position according to the urging force of the return spring 30 and the urging spring 43, the first slider 41 and the second slider 42 move toward the right in FIG. 3 by the urging force of the urging spring 43, following the upper-side arm portion 23.

During the return operation, by the urging force exerted by the urging spring 43, the first slider 41 and the second slider 42 exert a wedge action on each other, and a frictional force (sliding resistance) is generated with respect to the housing 10. The frictional force during the return operation acts in a direction opposite to the direction during the depression operation, and is reduced along with reduction of the compression amount of the urging spring 43.

Thus, due to a resultant force of the frictional force during the return operation which acts in the opposite direction and the urging force of the urging spring 43 which is reduced according to the return operation, pedal effort during the return is shown as a pedal effort line RNL on the lower side of the pedal effort line NL which forms the hysteresis of FIG. 5, and is reduced linearly along with the reduction of the depression amount (the opening degree of the accelerator pedal).

Here, the pedal effort during the return motion is smaller than the pedal effort during the depression operation, and thus as shown in FIG. 5, during the entire operation from the depression operation to the return operation, the hysteresis is generated in the pedal effort N.

Moreover, when the first slider 41 sticks and stops halfway through the return operation, the upper-side arm portion 23 is separated from the first slider 41 by the urging force of the return spring 30, and thereby the accelerator pedal 20 is returned to the rest position.

The position sensor 50 functions as a detection sensor which detects the motion of the accelerator pedal 20, is also referred to as an accelerator position sensor (APS), and is disposed in the cylindrical portion 21 of the accelerator pedal 20 and the embedding portion 14 of the housing 10 in a region surrounding the axis line S.

The position sensor 50 is, for example, a non-contact magnetic sensor, and as shown in FIG. 2 and FIG. 3, is configured by an annular armature 51, a pair of permanent magnets 52, two stators 53, and two hall elements 54.

The armature 51 is formed in an annular shape by a magnetic material and is embedded on an inner peripheral surface of the cylindrical portion 21 of the accelerator pedal 20.

The pair of permanent magnets 52 are formed in an arc shape and are joined to an inner peripheral surface of the armature 51.

The two stators 53 are formed by a magnetic material and are embedded in the embedding portion 14 of the housing 10.

The two hall elements 54 are disposed between the two stators 53 and are embedded in the embedding portion 14 of the housing 10.

As other associated components, a terminal and a circuit substrate on which various electronic components are mounted are embedded in the embedding portion 14.

Besides, the position sensor 50 detects, by the hall elements 54, a change in magnetic flux density which is generated by the pivot of the accelerator pedal 20, and outputs the change in the magnetic flux density as a voltage signal. That is, an opening degree position of the accelerator pedal 20 can be detected by the position sensor 50, and by the ratio of change in the voltage signal, whether the motion of the accelerator pedal 20 is in the depression operation or the return operation can be detected, or an operation force of a driver who operates the accelerator pedal 20 can be detected.

As shown in FIGS. 1 to 3, the reaction force addition mechanism 60 includes a torque motor 61 and the return lever 62 which is directly linked to the torque motor 61.

The torque motor 61 includes: a rotor 61*a* which has a magnet and rotates around the axis line S2; a yoke 61*b* which forms a magnetic circuit surrounding the rotor 61*a*; and a coil for excitation 61*c* which is wound around the yoke 61*b*.

Besides, the rotor 61*a* of the torque motor 61 and the return lever 62 are disposed in the accommodation portion 12 of the housing 10.

The torque motor 61 rotates the return lever 62 integrally with the rotor 61*a* in a manner that the return lever 62 reciprocates centering on the axis line S2 in a predetermined angle range.

Here, the torque motor 61 generates a constant rotational torque when a supplied drive current is constant, and if the supplied drive current is increased linearly, the generate rotational torque is increased linearly.

That is, when the drive of the torque motor 61 is controlled, the magnitude of the supplied drive current is adjusted according to an opening degree θ of the accelerator pedal 20. As shown in FIG. 3, the return lever 62 is directly linked to the rotor 61a of the torque motor 61 which pivots centering on the axis line S2, and a front-end portion of the return lever 62 is separably engaged with an intermediate portion of the upper-side arm portion 23 of the accelerator pedal 20.

Besides, when the torque motor 61 is not energized and does not exert the rotational torque, the return lever 62 is always engaged with the upper-side arm portion 23 by a magnetic spring and follows the oscillation of the accelerator pedal 20.

Here, the magnetic spring refers to a torque used for reinstating, when a rotor is compulsorily rotated from a neutral position in which the rotor stops when not energized, the rotor to the original neutral position by the action of the magnetic flux changing in the magnetic circuit. This neutral position corresponds to the rest position of the accelerator pedal 20.

Meanwhile, when the torque motor 61 is energized and generates the rotational torque, the return lever 62 resists against the pedal effort and adds a reaction force in a direction to push back the accelerator pedal 20.

As shown in FIGS. 1 and 2, the control unit 70 is disposed in the accommodation portion 15 positioned in an upper part of the housing 10.

Figure 4:
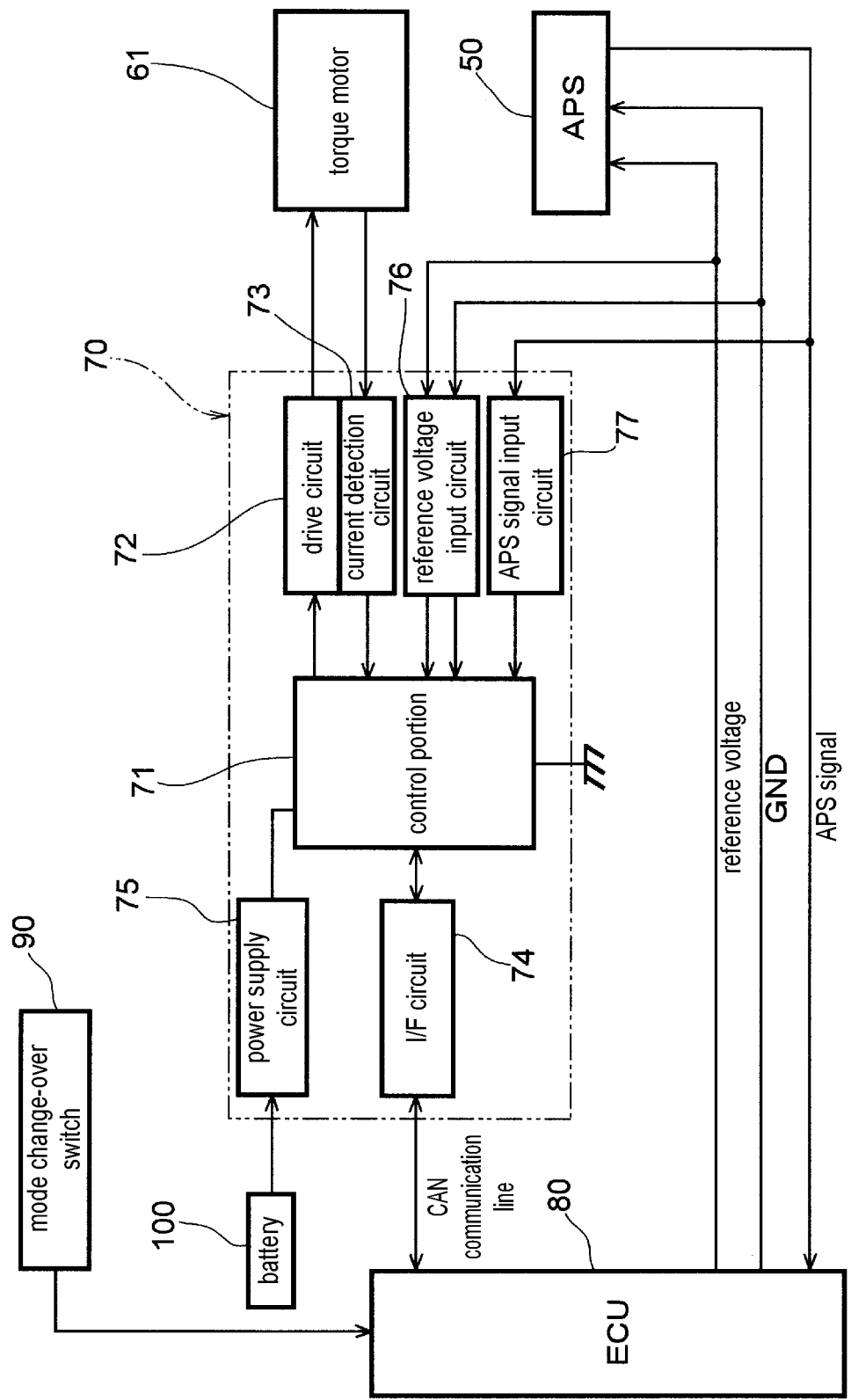
FIG. 4 is a block diagram showing a control system according to a reaction force addition mechanism included in the accelerator pedal device shown in FIG. 1.

As shown in FIG. 4, the control unit 70 includes: a control portion 71, a drive circuit 72, a current detection circuit 73, an interface circuit 74, a power supply circuit 75, a reference voltage input circuit 76, and an APS signal input circuit 77. Besides, in a state in which the above-described accelerator pedal device is mounted on the vehicle, an entire control system is configured by an ECU 80, a mode change-over switch 90, and a battery 100 which are respectively mounted on the vehicle, and the control unit 70.

The control portion 71 is a microcomputer or the like which governs various kinds of control in the accelerator pedal device, and the control portion 71 controls the drive of the torque motor 61 based on a command signal sent from the ECU 80.

In addition, the control portion 71 previously stores: a map which associates a drive current value of the torque motor 61 with generation torque; a map which associates various driving states of the vehicle with the opening degree of the accelerator pedal 20; information related to a plurality of target opening degrees of the accelerator pedal 20 which are previously set corresponding to various driving modes; a map which associates the opening degree of the accelerator pedal 20 with a rotational angle of the torque motor 61; and various pieces of other information as needed.

Besides, based on the command signal sent from the ECU 80, the various maps, and the various pieces of information, the control portion 71 performs calculation processing and determination processing, and controls the drive of the torque motor 61.

Based on a control signal of the control portion 71, the drive circuit 72 drives the torque motor 61 by a PWM signal. The current detection circuit 73 detects an actual value of a current flowing through the torque motor 61.

The interface circuit 74 performs transmission/reception of a signal by controller area network communication (CAN) between the control portion 71 and the ECU 80.

The power supply circuit 75 guides power supply to the control portion 71.

The reference voltage input circuit 76 inputs a reference voltage of the position sensor 50 to the control portion 71. The APS signal input circuit 77 inputs an output signal of the position sensor 50 to the control portion 71.

The ECU 80 governs the control of the entire vehicle, and outputs, to the control portion 71 via the CAN communication, a control map which is previously stored based on the driving state of the vehicle and a command signal which is calculated based on an output signal from the mode change-over switch 90.

Here, the control map is, for example, a map or the like which associates the accelerator opening degree with a rotational speed of the engine, a speed of the vehicle, a load, a speed change state of transmission, a distance to a vehicle in front, road surface information, and driving modes.

Here, the driving modes includes, a normal drive mode, an eco-drive mode, a sports drive mode, and the like.

The mode change-over switch 90 is arranged on the vehicle, and a turn-on/turn-off operation of the mode change-over switch 90 is performed by an operation of the driver.

It is set that if the driver turns on the mode change-over switch 90, for example, the eco-drive mode is selected, and if the driver turns off the mode change-over switch 90, the normal drive mode is selected.

Moreover, the mode change-over switch 90 may be set to be capable of selecting a plurality of driving modes including the normal drive mode, the eco-drive mode, the sports drive mode, and the like.

In the control system, based on the output signal of the position sensor 50, the control portion 71 or the ECU 80 executes the calculation processing and the determination processing of determining the opening degree of the accelerator pedal 20, and determining motion directions of the depression operation and the return operation or the magnitude of the operation force of the driver as needed.

In addition, because the torque motor 61 pivots in conjunction with the opening degree of the accelerator pedal 20, the control unit 70 controls the drive of the torque motor 61 based on information of the position sensor 50.

In addition, in the control system, when the accelerator pedal 20 is depressed, based on information related to the driving state of the vehicle and the like, the control unit 70 controls the drive of the reaction force addition mechanism 60 in order to add a reaction force by which the accelerator pedal 20 is maintained at a target opening degree θt which is previously set corresponding to this driving state.

That is, the control unit 70 controls the drive of the reaction force addition mechanism 60 in a manner that, with the predetermined target opening degree θt at which the accelerator pedal 20 is depressed as a boundary, the ratio (ΔN/Δθ) of change in the pedal effort in an opening degree range above the target opening degree θt becomes relatively larger than the ratio (ΔN/Δθ) of change in the pedal effort in an opening degree range below the target opening degree θt.

Next, normal motions when the reaction force addition mechanism 60 does not work in the accelerator pedal device are described.

Firstly, when the accelerator pedal 20 is not operated, the accelerator pedal 20 stops in the rest position by the urging force of the return spring 30.

If the depression operation of the accelerator pedal 20 is performed from the state, the driver receives the pedal effort along the pedal effort line DNL in FIG. 5, and the accelerator pedal 20 rotates in a counter-clockwise direction in FIG. 3 against the urging force of the return spring 30 and stops in the maximum depression position.

In the depression operation, when the torque motor 61 is in a non-energized state, the return lever 62 follows the movement of the accelerator pedal 20 without adding a reaction force.

Meanwhile, if the return operation of the accelerator pedal 20 is performed, the driver receives the pedal effort along the pedal effort line RNL in FIG. 5, and the accelerator pedal 20 rotates in a clockwise direction FIG. 3 by the urging force of the return spring 30, and stops in the rest position.

In the return operation, when the torque motor 61 is in a non-energized state, the return lever 62 follows the movement of the accelerator pedal 20 without adding a reaction force.

Next, a first embodiment when the drive of the reaction force addition mechanism 60 is controlled in the accelerator pedal device is described.

Figure 6:
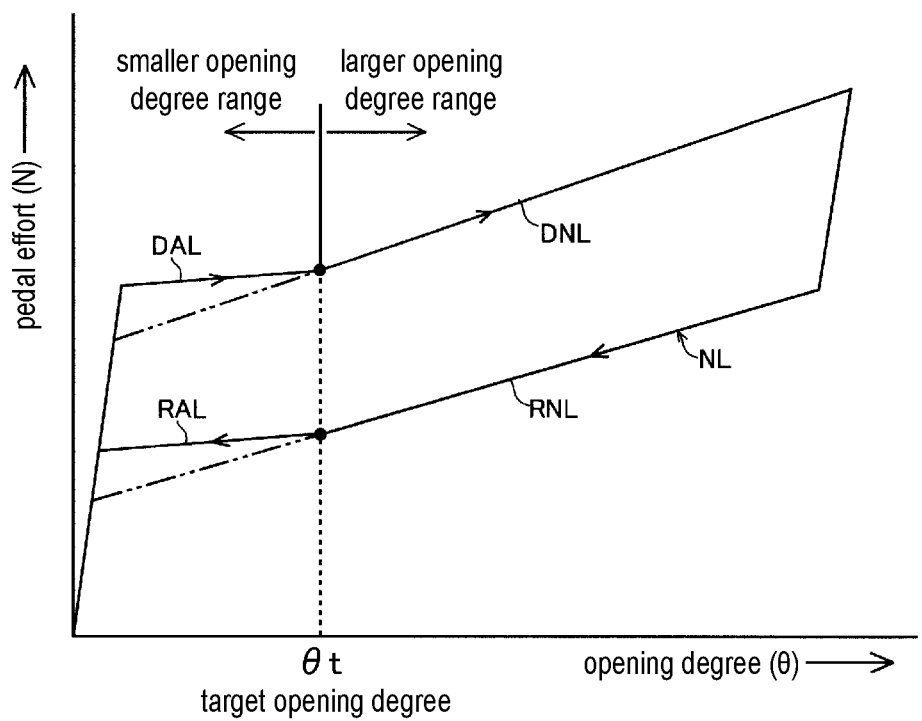
FIG. 6 is a pedal effort characteristic diagram showing a first embodiment in which a reaction force is added by the reaction force addition mechanism in the pedal effort which forms the hysteresis shown in FIG. 5.

In the first embodiment, as shown in FIG. 6, the control unit 70 controls the drive of the reaction force addition mechanism 60 in order to add, in the opening degree range below the target opening degree $\theta$, the reaction force which is gradually reduced along with the increase in the opening degree $\theta$ of the accelerator pedal 20.

If the driver turns on the mode change-over switch 90 and selects the eco-drive mode, based on the turn-on operation of the mode change-over switch 90, the command signal is sent from the ECU 80 to the control portion 71 via the interface circuit 74. Here, the target opening degree $\theta t$ is set corresponding to the accelerator opening degree of the eco-drive mode.

Besides, based on the command signal of the ECU 80, the output signal of the position sensor 50, and the like, the control portion 71 executes various kinds of calculation processing and determination processing, and appropriately controls the magnitude of the drive current which is supplied to the torque motor 61 via the drive circuit 72.

Here, the control unit 70 controls the drive of the reaction force addition mechanism 60 in conjunction with the turn-on operation of the mode change-over switch 90.

That is, as shown in FIG. 6, during the depression operation of the accelerator pedal 20, the drive of the torque motor 61 is controlled in a manner that the pedal effort N becomes a pedal effort line DAL in which a reaction force that is gradually reduced toward the target opening degree $\theta t$ is added in the opening degree range below the target opening degree $\theta t$, and which is higher than the normal pedal effort line DNL; and the pedal effort N becomes the normal pedal effort line DNL in which the reaction force is not added at the target opening degree $\theta t$.

At this time, the drive current supplied to the torque motor 61 is controlled to be gradually reduced from the predetermined magnitude along with the increase in the opening degree of the accelerator pedal 20, and become zero at the target opening degree $\theta t$.

In a state in which this reaction force is added, during the return operation of the accelerator pedal 20, the pedal effort N becomes a pedal effort line RAL higher than the normal pedal effort line RNL in the opening degree range below the target opening degree $\theta t$.

In short, the drive of the reaction force addition mechanism 60 is controlled in a manner that, with the target opening degree $\theta t$ as a boundary, the ratio ($\Delta N/\Delta\theta$) of change in the pedal effort (the pedal effort line DNL) in the opening degree range above the target opening degree $\theta t$ becomes relatively larger than the ratio ($\Delta N/\Delta\theta$) of change in the pedal effort (the pedal effort line DAL) in the opening degree range below the target opening degree $\theta t$.

Pedal effort characteristic is controlled in this way, and thereby the driver can smoothly depress until the target opening degree $\theta t$. In addition, because the driver receives a feeling that the pedal effort N is gradually increased with the target opening degree $\theta t$ as an inflection point, the driver does not feel uncomfortable or tired in the operation and the return motion of the accelerator pedal caused by a rapid change as conventional.

Thus, the driver can easily recognize the target opening degree $\theta t$ corresponding to the inflection point, and can easily maintain the accelerator pedal 20 at the target opening degree $\theta t$.

Meanwhile, if the driver turns off the mode change-over switch 90 and selects the normal drive mode, based on the turn-off operation of the mode change-over switch 90, the command signal is sent from the ECU 80 to the control portion 71 via the interface circuit 74.

Besides, the control of the drive of the reaction force addition mechanism 60 which is performed by the control unit 70 is released. Accordingly, the pedal effort N of the accelerator pedal 20 becomes the normal pedal effort lines DNL and RNL shown in FIG. 5.

Moreover, even if the reaction force addition mechanism 60 temporarily fails to work, the return lever 62 can be separated from the upper-side arm portion 23 of the accelerator pedal 20, and thus the accelerator pedal 20 can reliably return to the rest position. In addition, even if the hysteresis generation mechanism 40 fails to work, the return spring 30 directly exerts the urging force with respect to the accelerator pedal 20, and thus the accelerator pedal 20 can reliably return to the rest position.

Next, a second embodiment when the drive of the reaction force addition mechanism 60 is controlled in the accelerator pedal device is described.

Figure 7:
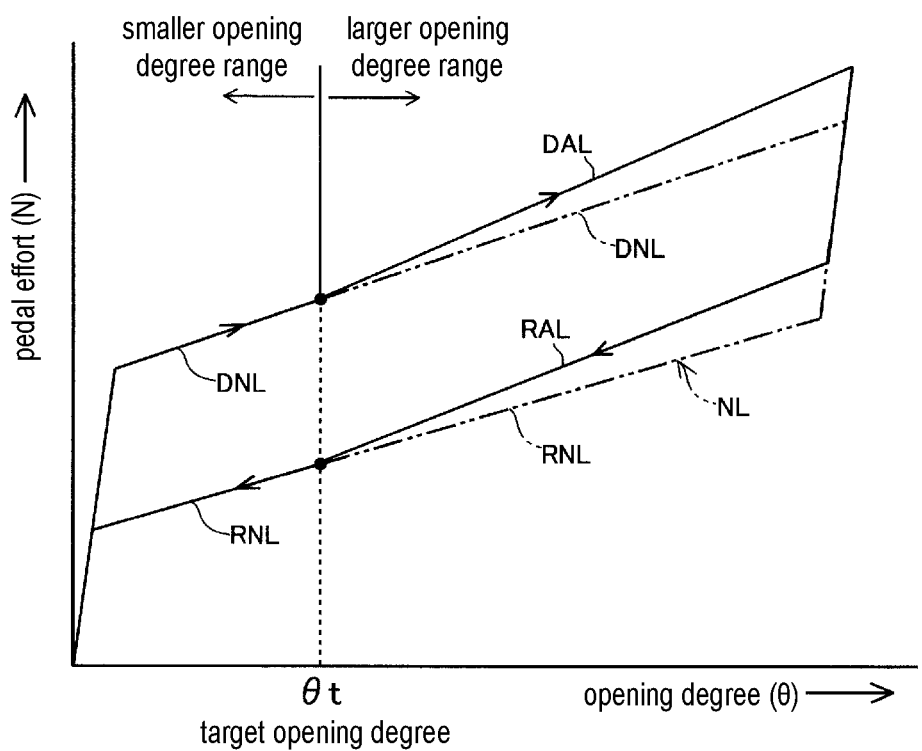
FIG. 7 is a pedal effort characteristic diagram showing a second embodiment in which a reaction force is added by the reaction force addition mechanism in the pedal effort which forms the hysteresis shown in FIG. 5.

In the second embodiment, as shown in FIG. 7, the control unit 70 controls the drive of the reaction force addition mechanism 60 in order to add, in the opening degree range above the target opening degree $\theta t$, the reaction force which is gradually increased along with the increase in the opening degree $\theta$ of the accelerator pedal 20.

Moreover, the calculation processing and the determination processing of the control portion 71 and the like based on the turn-on/turn-off operation of the mode change-over switch 90 which is performed by the driver are the same as those in the first embodiment described above, and thus descriptions are omitted.

That is, in the second embodiment, as shown in FIG. 7, during the depression operation of the accelerator pedal 20, the drive of the torque motor 61 is controlled in a manner that the pedal effort N becomes the normal pedal effort line DNL in which the reaction force is not added in the opening degree range below the target opening degree $\theta t$ and at the target opening degree $\theta t$; and the pedal effort N becomes the pedal effort line DAL in which a reaction force that is gradually increased along with the increase in the opening degree of the accelerator pedal 20 is added in the opening degree range above the target opening degree $\theta t$.

At this time, the drive current supplied to the torque motor 61 is controlled to be gradually increased from the target opening degree $\theta t$ along with the increase in the opening degree of the accelerator pedal 20.

In a state in which this reaction force is added, during the return operation of the accelerator pedal 20, the pedal effort N becomes the pedal effort line RAL higher than the normal pedal effort line RNL in the opening degree range above the target opening degree $\theta t$.

In short, the drive of the reaction force addition mechanism 60 is controlled in a manner that, with the target opening degree θt as a boundary, the ratio (ΔN/Δθ) of change in the pedal effort (the pedal effort line DAL) in the opening degree range above the target opening degree θt becomes relatively larger than the ratio (ΔN/Δθ) of change in the pedal effort (the pedal effort line DNL) in the opening degree range below the target opening degree θt.

Pedal effort characteristic is controlled in this way, and thereby if the driver depresses until the target opening degree θt, because the driver receives a feeling that the pedal effort N is gradually increased with the target opening degree θt as an inflection point, the driver does not feel uncomfortable or tired in the operation and the return motion of the accelerator pedal caused by a rapid change as conventional.

Thus, the driver can easily recognize the target opening degree θt corresponding to the inflection point, and can easily maintain the accelerator pedal 20 at the target opening degree θt.

Next, a third embodiment when the drive of the reaction force addition mechanism 60 is controlled in the accelerator pedal device is described.

Figure 8:
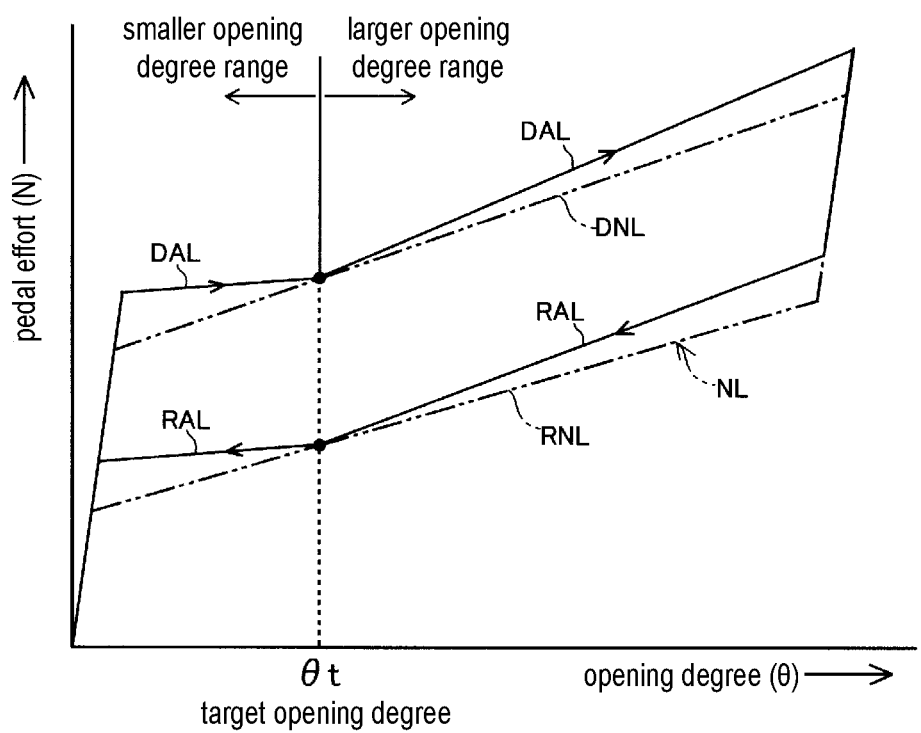
FIG. 8 is a pedal effort characteristic diagram showing a third embodiment in which a reaction force is added by the reaction force addition mechanism in the pedal effort which forms the hysteresis shown in FIG. 5.

In the third embodiment, as shown in FIG. 8, the control unit 70 controls the drive of the reaction force addition mechanism 60 in order to add, in the opening degree range below the target opening degree θt, a reaction force which is gradually reduced along with the increase in the opening degree θ of the accelerator pedal 20; and add, in the opening degree range above the target opening degree θt, a reaction force which is gradually increased along with the increase in the opening degree θ of the accelerator pedal 20.

Moreover, the calculation processing and the determination processing of the control portion 71 and the like based on the turn-on/turn-off operation of the mode change-over switch 90 which is performed by the driver are the same as the first embodiment described above, and thus descriptions are omitted.

That is, in the third embodiment, as shown in FIG. 8, during the depression operation of the accelerator pedal 20, the drive of the torque motor 61 is controlled in a manner that the pedal effort N becomes the pedal effort line DAL in which the reaction force that is gradually reduced toward the target opening degree θt is added in the opening degree range below the target opening degree θt, and which is higher than the normal pedal effort line DNL; the pedal effort N becomes the normal pedal effort line DNL in which the reaction force is not added at the target opening degree θt; and the pedal effort N becomes the pedal effort line DAL in which reaction force that is gradually increased along with the increase in the opening degree θ of the accelerator pedal 20 is added in the opening degree range above the target opening degree θt.

At this time, the drive current supplied to the torque motor 61 is controlled to be gradually reduced from the predetermined magnitude along with the increase in the opening degree of the accelerator pedal 20, become zero at the target opening degree θt, and be gradually increased along with the increase in the opening degree of the accelerator pedal 20 after the target opening degree θt is exceeded.

In a state in which this reaction force is added, during the return operation of the accelerator pedal 20, the pedal effort N becomes the pedal effort line RAL higher than the normal pedal effort line RNL in the opening degree range above the target opening degree θt, and the pedal effort N becomes the pedal effort line RAL higher than the normal pedal effort line RNL in the opening degree range below the target opening degree θt.

In short, the drive of the reaction force addition mechanism 60 is controlled in a manner that, with the target opening degree θt as a boundary, the ratio (ΔN/Δθ) of change in the pedal effort (the pedal effort line DAL) in the opening degree range above the target opening degree θt becomes relatively larger than the ratio (ΔN/Δθ) of change in the pedal effort (the pedal effort line DNL) in the opening degree range below the target opening degree θt.

Pedal effort characteristic is controlled in this way, and thereby the driver can smoothly depress until the target opening degree θt. In addition, if the driver depresses until the target opening degree θt, because the driver receives a feeling that the pedal effort N is gradually increased with the target opening degree θt as an inflection point, the driver does not feel uncomfortable or tired in the operation and the return motion of the accelerator pedal caused by a rapid change as conventional.

Thus, the driver can easily recognize the target opening degree θt corresponding to the inflection point, and can easily maintain the accelerator pedal 20 at the target opening degree θt.

Figure 9:
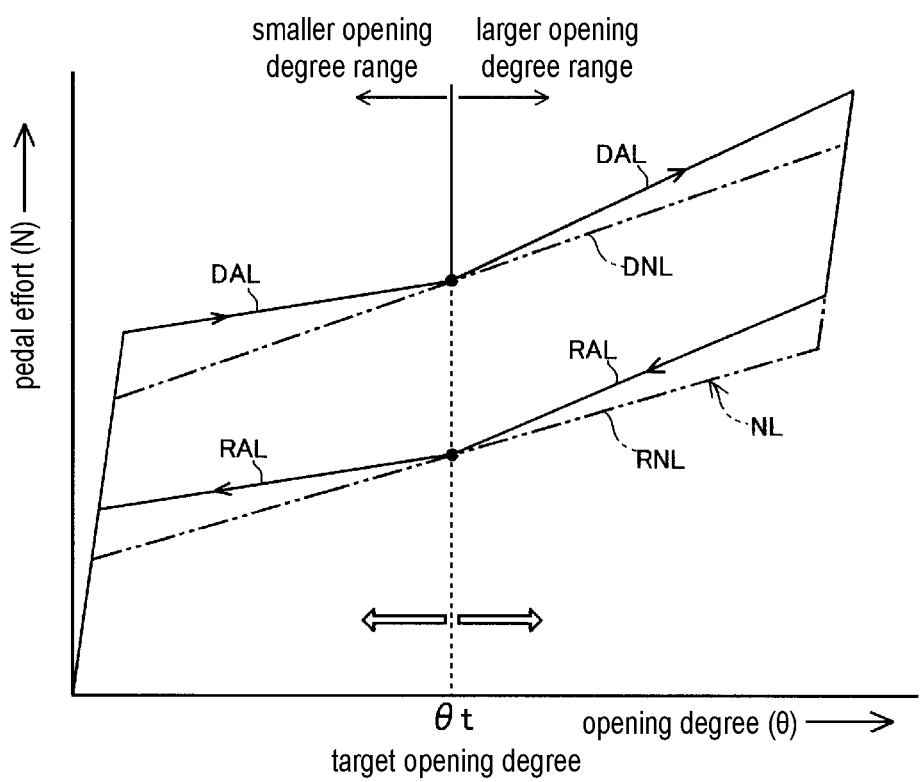
FIG. 9 is a pedal effort characteristic diagram showing a variation example of the third embodiment in which a reaction force is added by the reaction force addition mechanism in the pedal effort which forms the hysteresis shown in FIG. 5.

Here, as shown by arrows in FIG. 9, the target opening degree θt can be appropriately selected in a work range of the accelerator pedal 20.

That is, as the target opening degree θt, a plurality of target opening degrees θt are previously set corresponding to various driving states of the vehicle, and based on the target opening degree θt which is sent from the ECU 80 and corresponds to the command signal based on the driving state of the vehicle, the control unit 70 can control the drive of the reaction force addition mechanism 60.

In this way, the drive of the reaction force addition mechanism 60 is controlled according to the plurality of target opening degrees θt, and thereby according to a drive environment such as high-speed cruising drive on an expressway or the like and low-speed drive in a street or the like, and the plurality of driving modes, the driver can easily recognize each target opening degree θt, easily maintain the accelerator pedal 20 at this target opening degree θt, and perform the most appropriate drive without feeling tired or annoyed.

Moreover, here, with respect to the control of the drive of the reaction force addition mechanism 60 according to the third embodiment, a case is shown in which the plurality of target opening degrees θt are set, and the same is also performed in the control of the drive of the reaction force addition mechanism 60 according to the first embodiment and the second embodiment.

Figure 10:
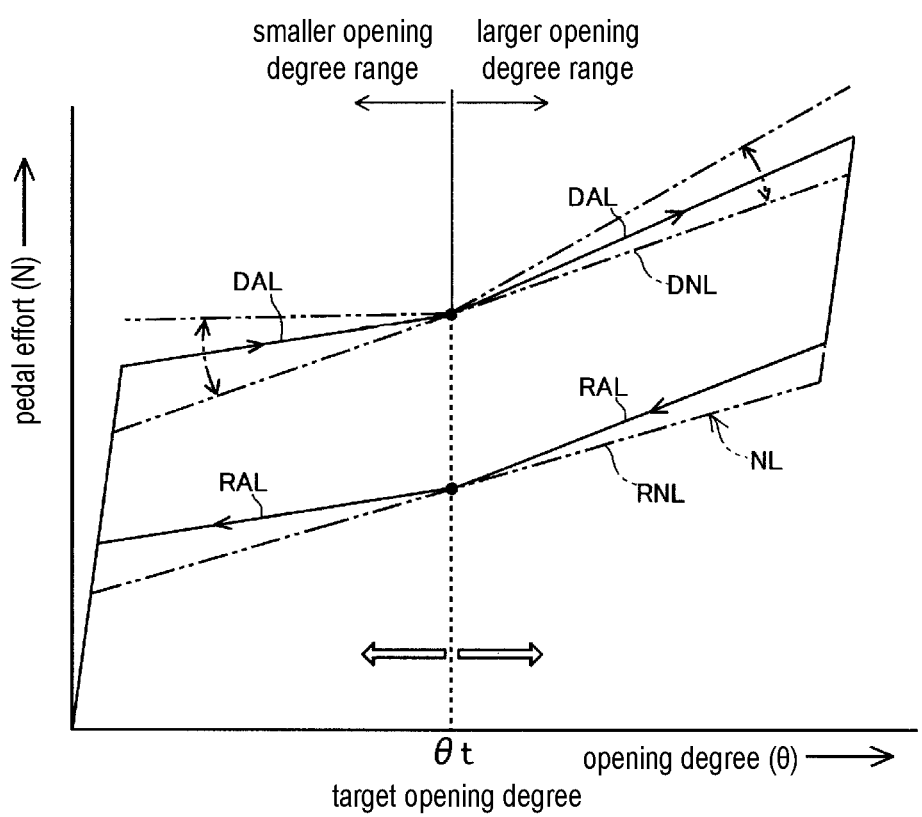
FIG. 10 is a pedal effort characteristic diagram showing another variation example of the third embodiment in which a reaction force is added by the reaction force addition mechanism in the pedal effort which forms the hysteresis shown in FIG. 5.

In addition, the pedal effort N (the pedal effort line DAL) when the reaction force is added can be appropriately set in a range shown by chain double-dashed lines in FIG. 10.

That is, the control unit 70 controls the drive of the reaction force addition mechanism 60 in order to add the reaction force in a manner that the ratio ΔN/Δθ of change in the pedal effort N has a magnitude according to the operation force of the driver who operates the accelerator pedal 20.

Moreover, the control of the drive is also performed based on the premise that the control unit 70 controls the drive of the reaction force addition mechanism 60 in a manner that, with the predetermined target opening degree θt at which the accelerator pedal is depressed as a boundary, the ratio ΔN/Δθ of change in the pedal effort N in the opening degree range above the target opening degree θt becomes relatively larger than the ratio $\Delta N/\Delta \theta$ of change in the pedal effort N in the opening degree range below the target opening degree $\theta t$.

Specifically, based on the ratio $\Delta V/\Delta t$ of change per hour in the voltage signal which is detected by the position sensor 50, the ECU 80 or the control portion 71 determines that it is an operation performed by a driver applying a large operation force (depression force) when the ratio of change is great, and determines that it is an operation performed by a driver applying a small operation force when the ratio of change is small. Besides, based on the control map and the like which are previously stored, the control portion 71 controls the drive of the reaction force addition mechanism 60 at the ratio $\Delta N/\Delta \theta$ of change in the pedal effort N corresponding to respective operation forces.

Generally, the operation force of the driver is respectively different depending on physique and gender, and the feeling of the pedal effort is also different for each driver. Thus, as shown in FIG. 10, by controlling the drive in order that the pedal effort characteristic is the most appropriate for the driver, no driver feels uncomfortable or tired in the operation and the return motion of the accelerator pedal caused by a rapid change as conventional.

Thus, the driver can easily recognize the target opening degree $\theta t$ corresponding to the inflection point, and can easily maintain the accelerator pedal 20 at the target opening degree $\theta t$.

Moreover, here, with respect to the control of the drive of the reaction force addition mechanism 60 according to the third embodiment, a case is shown in which the drive of the reaction force addition mechanism 60 is controlled in order to add the reaction force having a magnitude according to the operation force of the accelerator pedal 20, and the same is also performed in the control of the drive of the reaction force addition mechanism 60 according to the first embodiment and the second embodiment.

Furthermore, in the embodiments, a case is shown in which the control unit 70 controls the drive of the reaction force addition mechanism 60 so as not to adding the reaction force at the target opening degree $\theta t$, but the reaction force may be added at the target opening degree $\theta t$.

Figure 11:
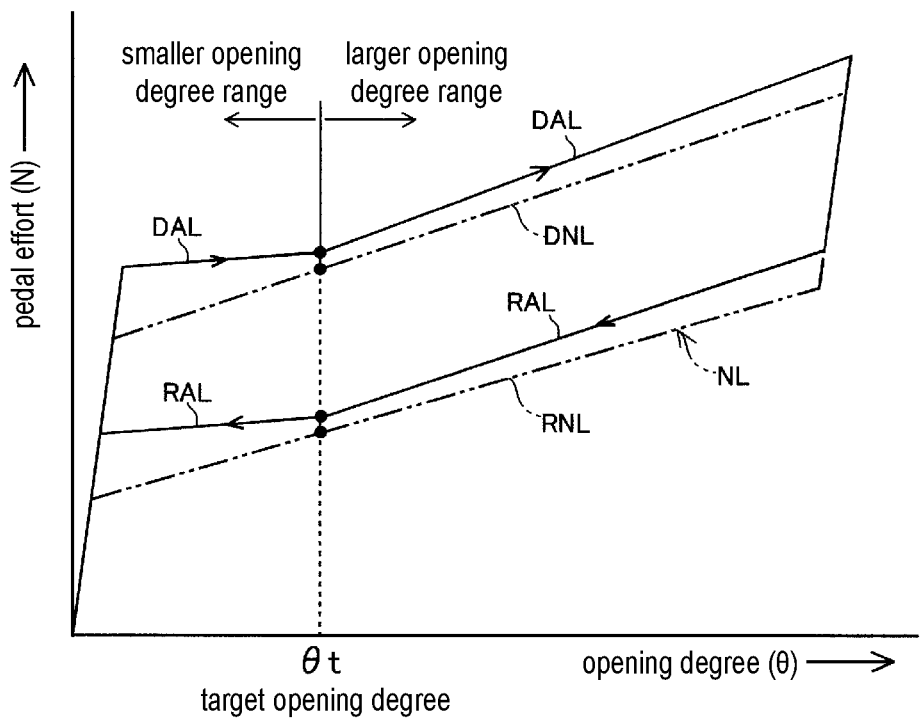
FIG. 11 is a pedal effort characteristic diagram showing still another variation example of the third embodiment in which a reaction force is added by the reaction force addition mechanism in the pedal effort which forms the hysteresis shown in FIG. 5.

For example, as shown in FIG. 11, during the depression operation of the accelerator pedal 20, the drive of the torque motor 61 is controlled in a manner that the pedal effort N becomes the pedal effort line DAL which is higher than the normal pedal effort line DNL, the pedal effort line DAL added with a reaction force gradually reduced toward the target opening degree $\theta t$ in the opening degree range below the target opening degree $\theta t$ and added with a predetermined amount of reaction force at the target opening degree $\theta t$; and the pedal effort N becomes the pedal effort line DAL in which reaction force that is gradually increased along with the increase in the opening degree $\theta$ of the accelerator pedal 20 is added in the opening degree range above the target opening degree $\theta t$.

At this time, the drive current supplied to the torque motor 61 is controlled to be gradually reduced from the predetermined magnitude along with the increase in the opening degree of the accelerator pedal 20 until the target opening degree $\theta t$, and be gradually increased along with the increase in the opening degree of the accelerator pedal 20 after the target opening degree $\theta t$ is exceeded.

In the state in which the reaction force is added, during the return operation of the accelerator pedal 20, the pedal effort N becomes the pedal effort line RAL higher than the normal pedal effort line RNL in the opening degree range above the target opening degree $\theta t$, and the pedal effort N becomes the pedal effort line RAL higher than the normal pedal effort line RNL in the opening degree range below the target opening degree $\theta t$.

In short, the drive of the reaction force addition mechanism 60 is controlled in a manner that, with the target opening degree $\theta t$ as a boundary, the ratio $(\Delta N/\Delta \theta)$ of change in the pedal effort (the pedal effort line DAL) in the opening degree range above the target opening degree $\theta t$ becomes relatively larger than the ratio $(\Delta N/\Delta \theta)$ of change in the pedal effort (the pedal effort line DNL) in the opening degree range below the target opening degree $\theta t$.

The pedal effort characteristic is controlled in this way, and thereby although the driver feels that the pedal effort is slightly increased in the whole region, the driver can smoothly depress until the target opening degree $\theta t$. In addition, if the driver depresses until the target opening degree $\theta t$, because the driver receives a feeling that the pedal effort N is gradually increased with the target opening degree $\theta t$ as an inflection point, the driver does not feel uncomfortable or tired in the operation and the return motion of the accelerator pedal caused by a rapid change as conventional.

Thus, although the driver feels a certain level of load, the driver can easily recognize the target opening degree $\theta t$ corresponding to the inflection point, and can easily maintain the accelerator pedal 20 at the target opening degree $\theta t$.

In the embodiments, as the reaction force addition mechanism, the reaction force addition mechanism 60 including the torque motor 61 is shown, but the present invention is not limited hereto, and other mechanisms may be used as long as the mechanism can add the reaction force in the direction to push back the accelerator pedal 20 and can be controlled.

In the embodiments, as the hysteresis generation mechanism, the hysteresis generation mechanism 40 configured by the first slider 41, the second slider 42, and the urging spring 43 is shown, but the present invention is not limited hereto, and other mechanisms may be used as long as the mechanism generates the hysteresis in the pedal effort.

In the embodiment, the case is shown in which the control unit 70 controls the drive of the reaction force addition mechanism 60 in conjunction with the turn-on operation of the mode change-over switch 90, and the control unit 70 releases the control of the drive of the reaction force addition mechanism 60 in conjunction with the turn-off operation of the mode change-over switch 90, but the present invention is not limited hereto. A configuration may be used in which, on the contrary, the control unit 70 releases the control of the drive of the reaction force addition mechanism 60 in conjunction with the turn-on operation of the mode change-over switch 90, and the control unit 70 controls the drive of the reaction force addition mechanism 60 in conjunction with the turn-off operation of the mode change-over switch 90.

In the embodiments, as the accelerator pedal, the accelerator pedal 20 which is supported to oscillate freely by the support shaft 11 of the housing 10 is shown, but the present invention is not limited hereto.

For example, the following accelerator pedals may be used: an accelerator pedal which is supported to oscillate freely by a floor of the vehicle, and an accelerator pedal including a link mechanism which makes a pedal portion that is supported to oscillate freely by the floor of the vehicle come into conjunction with a pedal arm portion that is supported to oscillate freely by the support shaft of the housing.

As described above, the accelerator pedal device of the present invention can easily recognize the target opening degree that is previously set according to the driving state, easily maintain the target opening degree, and achieve excellent operationality that will not make the driver feel uncomfortable when the reaction force is added. Thus, the accelerator pedal device of the present invention can certainly be applied to the automobile or the like, and is also useful for a work vehicle, other vehicles, or the like.

What is claimed is:

1. An accelerator pedal device, comprising:
an accelerator pedal;
a hysteresis generation mechanism that generates a hysteresis in pedal effort during a depression operation and a return operation of the accelerator pedal;
a reaction force addition mechanism that adds a reaction force in a direction to push back the accelerator pedal; and
a control unit that controls the drive of the reaction force addition mechanism in a manner that, with a predetermined target opening degree at which the accelerator pedal is depressed as a boundary, a slope of the relationship curve between pedal efforts and opening degrees in an opening degree range above the target opening degree becomes relatively larger than the slope of the relationship curve between pedal efforts and opening degrees in an opening degree range below the target opening degree.

2. The accelerator pedal device according to claim 1, wherein
the control unit controls the drive of the reaction force addition mechanism in a manner as not being to add the reaction force at the target opening degree.

3. The accelerator pedal device according to claim 1, wherein
the control unit controls the drive of the reaction force addition mechanism in order to add, in the opening degree range below the target opening degree, the reaction force which is gradually reduced along with the increase in the opening degree of the accelerator pedal.

4. The accelerator pedal device according to claim 1, wherein
the control unit controls the drive of the reaction force addition mechanism in order to add, in the opening degree range above the target opening degree, the reaction force which is gradually increased along with the increase in the opening degree of the accelerator pedal.

5. The accelerator pedal device according to claim 1, wherein
the control unit controls the drive of the reaction force addition mechanism in order to add, in the opening degree range below the target opening degree, a reaction force which is gradually reduced along with the increase in the opening degree of the accelerator pedal; and add, in the opening degree range above the target opening degree, a reaction force which is gradually increased along with the increase in the opening degree of the accelerator pedal.

6. The accelerator pedal device according to claim 1, wherein
the target opening degree comprises a plurality of target opening degrees which are previously set corresponding to various driving states of a vehicle, and
the control unit controls the drive of the reaction force addition mechanism based on a target opening degree corresponding to a command based on the driving state of the vehicle.

7. The accelerator pedal device according to claim 1, wherein
the control unit controls the drive of the reaction force addition mechanism in order to add the reaction force in a manner that the slope of the relationship curve between pedal efforts and opening degrees has magnitude according to an operation force of the accelerator pedal.

8. The accelerator pedal device according to claim 1, wherein
the control unit controls the drive of the reaction force addition mechanism in conjunction with an operation of a switch arranged on the vehicle.

9. The accelerator pedal device according to claim 1, wherein
the reaction force addition mechanism comprises a torque motor which exerts a rotational torque taken as the reaction force, and
the control unit adjusts a magnitude of a drive current supplied to the torque motor according to the opening degree of the accelerator pedal.

10. The accelerator pedal device according to claim 9, comprising
a detection sensor which detects the motion of the accelerator pedal, wherein
the control unit controls the drive of the torque motor based on information of the detection sensor.

11. The accelerator pedal device according to claim 9, wherein
the control unit controls the drive of the torque motor based on information related to a driving state of the vehicle.

* * * * *